United States Patent [19]
Minnetian et al.

[11] Patent Number: 5,759,420
[45] Date of Patent: Jun. 2, 1998

[54] PRODUCTION OF PARTIALLY METALLISED GRATING STRUCTURES

[75] Inventors: Ohannes Minnetian, Eschenbach; Beat Nauer, Einsiedeln, both of Switzerland

[73] Assignee: Landis & Gyr Technology Innovation AG, Zug, Switzerland

[21] Appl. No.: 649,102

[22] Filed: May 17, 1996

[30] Foreign Application Priority Data

Aug. 10, 1995 [CH] Switzerland ............... 2299/95

[51] Int. Cl.$^6$ ................................................ B29D 11/00
[52] U.S. Cl. ........................... 216/24; 216/32; 216/34; 216/35
[58] Field of Search ........................... 216/24, 32, 34, 216/35

[56] References Cited

U.S. PATENT DOCUMENTS

| | | | |
|---|---|---|---|
| 3,647,508 | 3/1972 | Gorrell | 252/79.4 |
| 4,662,653 | 5/1987 | Greenaway | 283/91 |
| 5,004,673 | 4/1991 | Vlannes | 216/24 |
| 5,300,190 | 4/1994 | Sugimoto et al. | 216/24 |

FOREIGN PATENT DOCUMENTS

| | | |
|---|---|---|
| 0 372 274 A3 | 4/1991 | European Pat. Off. . |
| 0 253 089 B1 | 9/1991 | European Pat. Off. . |
| 0 537 439 A1 | 4/1993 | European Pat. Off. . |
| 670 904 A5 | 7/1989 | Switzerland . |

*Primary Examiner*—Roland Martin
*Attorney, Agent, or Firm*—Meltzer, Lippe, Goldstein, Wolf & Schlissel, P.C.

[57] ABSTRACT

A process for producing a partially transparent, visually discernible surface pattern with surface elements which diffusely scatter, reflect or diffract light incident on the surface pattern commences with a base foil which may include a carrier foil and a lacquer layer, and also an intermediate layer between these two layers to provide for good adhesion. Before or after application of the microscopically fine relief structures in the lacquer layer, the free surface thereof is covered over its entire area with a reflection layer. A printed image is then printed with an etching agent for the reflective material on the reflection layer in such a way that, at surface portions corresponding to the printed image, the reflection layer is removed and the surface of the lacquer layer is exposed again. The exposed surfaces of the lacquer layer and the remaining surfaces of the reflection layer are covered with at least one protective layer so that the relief structures are embedded in a plastic laminate and adhesive bridges are formed where the lacquer layer and protective layer are in direct contact.

16 Claims, 2 Drawing Sheets

PRODUCTION OF PARTIALLY METALLISED GRATING STRUCTURES

BACKGROUND OF THE INVENTION

1. Field of the Invention

The invention relates generally to production of partially metallised grating structures and may be applied in processes for producing partially metallised surface patterns comprising surfaces with reflecting light-diffracting grating structures and transparent surface portions. The invention finds particular application in a process for producing a partially transparent security element having a visually discernible surface pattern comprising diffraction-optically effective optical markings with non-continuous reflection layers and transparent adhesive bridges embedded into a plastic laminate.

Partially metallised surface patterns of that kind contain relief structures with light-diffracting properties such as holograms, two-dimensional images composed of surface elements with diffraction gratings, and so forth, and are used to enhance the safeguards in terms of forgery of banknotes, documents and articles of all kinds.

2. Description of the Prior Art

Partially metallised surface patterns are known from Swiss patent specification No. 670 904. The light-diffracting relief structure is embedded in a multi-layer document. Two protective layers enclose the light-diffracting relief structures, while in predetermined surface portions an optically active intermediate layer forms the interface between the two protective layers. The surface portions are separated by surfaces without the intermediate layer, in which the two protective layers are directly connected together. In the bridges the connection between the two protective layers affords particularly good adhesion. With transparent protective layers, the document is transparent at the surface portions which are not covered by the optically active intermediate layer. The production process involves printing on a plastic foil with the embossed light-diffracting relief structures, in the surfaces which are to be kept free of the optically active intermediate layer, with a layer which can be washed off. The optically active intermediate layer is applied to the printed and unprinted surface portions of the plastic foil. A washing process removes the layer which can be washed off, and the intermediate layer which adheres thereto. After the drying operation, the second protective layer is applied. This therefore covers only the light-diffracting relief structures. It is only in the predetermined surface portions with the optically active intermediate layer that the relief structures produce the typical brilliant play of colours produced by the diffraction of white light, while no diffraction effects are to be observed at the relief structures in the surfaces without the optically active intermediate layer.

It is known from British application No. GB-A-2 136 352 for the plastic foil to be embossed with the light-diffracting relief structure and to be covered over its entire surface area with the reflecting intermediate layer. Then the surfaces which are predetermined for the diffraction of light are printed upon with a protective mask and the exposed intermediate layer is removed by means of an etching agent in order to obtain the partially metallised surface pattern.

U.S. Pat. No. 3,647,508 discloses compositions for etching agents which are to be applied to a vapour-deposited metal layer by a printing procedure and which do not attack a plastic carrier.

European patent application No. EP-201 323 A2 contains a compilation of almost all plastics and materials for a reflection layer, which can be used for the production of plastic laminates with optical-diffraction relief structures.

SUMMARY OF THE INVENTION

An object of the present invention is to provide a simpler and less expensive process for producing partially metallised surface patterns of the kind set forth in the opening part of this specification.

In accordance with one aspect of the invention there is provided a process for producing a partially transparent security element having a visually discernible surface pattern comprising diffraction-optically effective optical markings with non-continuous reflection layers and transparent adhesive bridges embedded into a plastic laminate, the process comprising:

forming microscopically fine relief structures in a lacquer layer of a base foil;

covering over the full surface area of said lacquer layer with a reflection layer;

applying an etching agent to said reflection layer by a printing procedure as a predetermined printed image, whereby, at surface portions corresponding to said printed image, said reflection layer is removed by said etching agent and the surface of said lacquer layer is exposed; and forming said plastic laminate by covering the lacquer layer at said surface portions and the remaining surfaces of said reflection layer with at least one transparent protective layer, whereby said transparent adhesive bridges are produced at said surface portions from the direct connection of said lacquer layer to said protective layer.

Another aspect of the invention provides a process for producing a partially transparent security element having a visually discernible surface pattern comprising diffraction-optically effective optical markings with non-continuous reflection layers and transparent adhesive bridges embedded into a plastic laminate, the process comprising:

embossing a base foil comprising a lacquer layer which is covered with a reflection layer with microscopically fine relief structures;

applying an etching agent to said reflection layer by a printing procedure as a predetermined printed image, whereby, at surface portions corresponding to said printed image, said reflection layer is removed by said etching agent and the surface of said lacquer layer is exposed; and forming said plastic laminate by covering the lacquer layer at said surface portions and the remaining surfaces of said reflection layer with at least one transparent protective layer, whereby said transparent adhesive bridges are produced at said surface portions from the direct connection of said lacquer layer to said protective layer.

Advantageous configurations of the invention are set forth in the appendant claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
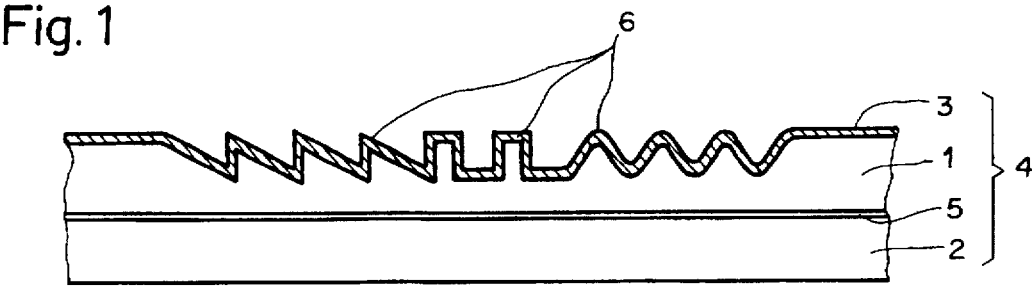
FIG. 1 shows a base foil.

In FIG. 1 reference numeral 1 denotes a transparent lacquer layer, and reference numeral 2 denotes a carrier foil which is coated with the transparent lacquer layer 1. The free surface of the lacquer layer 1 can be covered with a reflection layer 3. Coated carrier foils 2 of that kind are commercially available in the form of a base foil 4 in strip form on rolls of various widths with or without a reflection layer 3.

Many different configurations are known for the layer structure of the base foil 4 for the production of security elements with optical diffraction elements. The base foil 4 includes the carrier foil 2, for example a polyester strip which is 10 to 50 micrometers in thickness, the lacquer layer 1 which is applied in the form of an acrylic lacquer of 1 to 10 micrometers but preferably 1 to 3 micrometers in thickness, and an intermediate layer 5 of 0.1 to 0.4 micrometers in thickness, which is disposed between the carrier foil 2 and the lacquer layer 1. The carrier foil 2 imparts to the lacquer layer 1 the mechanical strength which is necessary for the further production steps. In the case of identity cards and value-bearing cards, the carrier foil 2 can serve directly as the card base, in which case the thickness of the carrier foil 2 is in the range of 0.1 mm to 1 mm or more.

If the intermediate layer 5 comprises a wax-like substance, the intermediate layer 5 acts as a separation layer. The carrier foil 2 is easily detached from the lacquer layer 1, by the application of heat. If in contrast the carrier foil 2 is still to remain inseparably joined to the lacquer layer 1 after the production process, in the form of a transparent protection, the intermediate layer 5 comprises a so-called bonding agent or primer which is for example a lacquer formed on a polyurethane basis. The carrier foil 2 can also be pre-treated by a corona discharge in such a way that the lacquer layer 1 enjoys good adhesion to the carrier foil 2 itself. In that case the intermediate layer 5 is redundant.

The reflection layer 3 comprises either metallic or dielectric material. In particular aluminium is advantageously used for the reflection layer 3 as it has a very high level of optical reflectivity and permits an inexpensive production procedure to be adopted. For particular optical colour effects, it is also possible to use other metallic or dielectric materials which are referred to in above-mentioned EP-201 323 A2, but in particular metals such as chromium, iron, gold, copper, magnesium, nickel, silver etc.

The pre-fabricated base foils 4 advantageously already have the reflection layer 3 whose thickness is between 1 nm and 50 nm, depending on the respective material involved. Microscopically fine relief structures 6 are formed in the lacquer layer 1 through the free surface of that very thin reflection layer 3, by a die (not shown here), with the negative of the relief structures 6. The relief structures 6 are holograms or graphically composed surface elements with diffraction-active microscopically fine relief structures which differ in terms of line spacing, azimuth and profile shape, being the grating parameters. The grating parameters determine the optical properties of the relief structure 6. After the operation of forming the relief structures, the base foil 4 has on the lacquer layer 1 a relief pattern comprising the relief structures 6. Upon being illuminated the relief pattern produces a two-dimensional surface image which is composed of surface elements with different grating parameters. Some of the surface elements of the relief pattern have a completely flat, mirror-smooth structure or a matt, light-scattering structure, as an extreme relief structure 6. The relief pattern is made up of graphic surface elements or pixels (=picture elements) and is therefore characteristically subdivided into a multiplicity of surface elements. The relief patterns form a regular arrangement on the base foil 4, for example a plurality of relief patterns in a row transversely over the strip, which is repeated at a predetermined register spacing in the direction of travel of the strip. The differences in height of the relief structures 6 are dependent on the diffraction property which is predetermined for same and are small in comparison with the thickness of the lacquer layer 1. For example the maximum differences in height are about 400 nm when the thickness of the lacquer layer 1 is 1000 nm. As described in EP-392 085 A1, alignment aids are also advantageously embossed onto the base foil 4 in the longitudinal direction at periodic spacings simultaneously with the operation of forming the relief patterns, which alignment aids are comparable to the marks which are conventionally employed in the printing art for alignment in accurate register relationship of successive operating procedures. The base foil 4 with the relief structures 6 which are now formed thereon can in turn be put into intermediate storage in a rolled-up condition.

Figure 2:
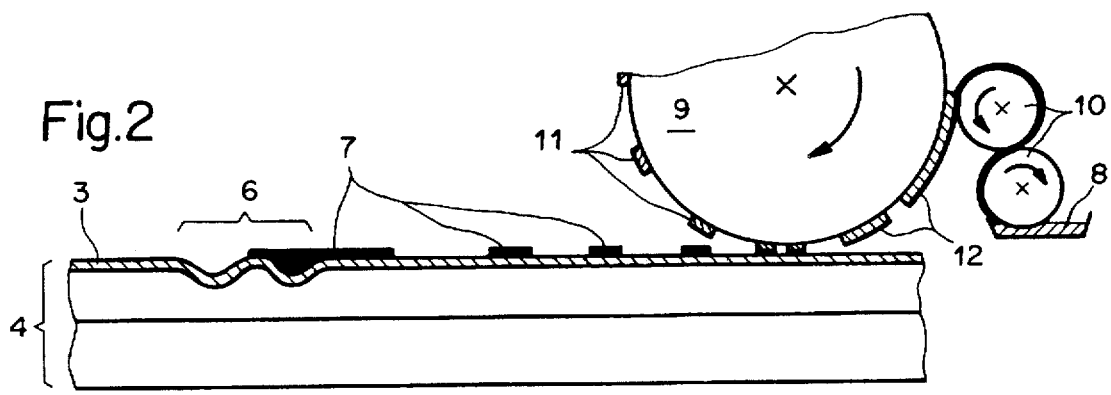
FIG. 2 shows the operation of printing an etching agent onto the base foil.

FIG. 2 shows removal of the reflection layer 3 in predetermined surface portions 7 as the next step in further processing. The surface portions 7 therefore become transparent again, in spite of the relief structure 6, and no diffraction effects occur at those locations or any diffraction effects which occur there are substantially weaker in terms of the light involved, than outside those surface portions 7.

An etching agent 8 is applied to the reflection layer 3 in the surface portions 7 by means of one of the known printing processes, for example by means of a rotary printing mechanism 9, 10 comprising a printing cylinder 9 and applicator rolls 10, or also with an inexpensive ink jet printer or by screen printing. The surface portions 7 form a printed image which can comprise geometrical surface elements, graphic symbols, alphanumeric characters or scanning images. The surface portions 7 of the printed image can in themselves be selected independently of the surface elements of the relief pattern comprising the relief structures 6. The printed image and the relief pattern together form a visually perceptible image or surface pattern of the security element. The centres of the printed image and the relief pattern advantageously coincide and present the same register spacing. By combining different printed images with the same relief pattern, it is possible inexpensively to produce security elements with different perceptible surface patterns, using the same die, which is expensive in comparison with the cliche, with the negative of the relief structures 6. The surface area proportion of the surface portions 7 in the region of the relief pattern is determined by the degree of transparency desired.

Acid and alkaline etching agents are suitable for aluminium, in which respect satisfactory results are achieved with NaOH or KOH.

In the illustrated embodiment the printing cylinder 9 carries a cliche which is in the form of a raised mesa structure 11 corresponding to the printed image. Like the ink in letterpress printing, the etching agent 8 is applied by the rollers 10 to the mesa structure 11 in the form of a layer 12, in this printing mechanism 9, 10. When the printing cylinder 9 rolls, the layers 12 of the etching agent 8 are transferred onto the reflection layer 3 in the surface portions 7. If necessary the etching agent 8 is adjusted to the consistency which is suitable for the printing operation by a thickening agent such as flour or starch, hydrophobised silicic acid, Aerosil® and other additives, as is described in above-mentioned U.S. Pat. No. 3,647,508. The mesa structure 11 of the print pattern is rolled onto the base foil 4 with each revolution of the printing cylinder 9 and the etching agent 8 is applied in register relationship with the embossed relief structures 6 in a continuous-run procedure.

The etching agent 8 on the surface portions 7 reacts with the material of the reflection layer 3 and chemically dissolves same. As the reflection layer 3 is generally less than 50 nm in thickness, dissolution of the reflecting material takes place very quickly and before the etching agent penetrates beyond the limits of the surface portions 7. A subsequent cleaning process removes the residues of the etching process so that the surface portions 7 are completely free of the reflection layer 3. Outside the surface portions 7 of the printed image the reflection layer 3 forms sharply edged islands which are arranged on the embossed base foil 4 with the high degree of accuracy (about 0.05 mm) which is usual in the printing art.

For etching the surface portions 7 free, it is immaterial whether the base foil 4 is or is not already embossed as the slight differences in height of less than one micrometer within the relief structure 6 are filled with etching agent 8 when the layer 12 is applied. The reflection layer 3 is therefore reliably removed even in the depths of the relief configuration. In FIG. 2 a relief structure 6 which has been partially printed upon with etching agent 8 is shown on the left-hand side of the drawing while printing etching agent onto an unembossed part of the base foil 4 is shown on the right-hand side.

Figure 3:
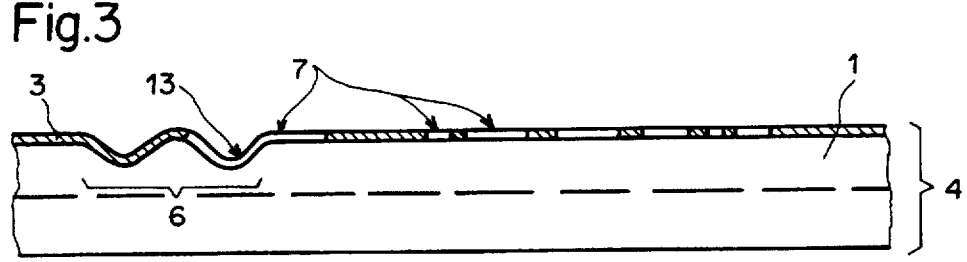
FIG. 3 shows the base foil after the etching step.

FIG. 3 shows the base foil 4 of FIG. 2 after the etching and cleaning process. The reflection layer 3 which is shown by hatching, after the etching operation, has in the surface portions 7 depressions in which the surface of the lacquer layer 1 is exposed.

In another process, the operation of printing on the base foil 4 when it has not yet been embossed, with the etching agent 8 (FIG. 2), is effected first in a similar manner as is known from U.S. Pat. No. 3,647,508. Subsequently to the cleaning process, the relief structures 6 are formed by embossing in register relationship with the surface portions 7 which have been etched out, in which case the relief structures 6 are produced by embossing both in the surface portions 7 and also in areas with the reflection layer 3.

In a further process the replication operation using the die with the negative of the relief structures 6 is effected during application of the lacquer layer 1 to the carrier foil 2. Curing of the liquid lacquer for the lacquer layer 1 is initiated by means of ultraviolet light, the relief configuration of the die being reproduced in the curing lacquer layer 1 while it is still soft. The reflection layer 3 is then applied to the cured lacquer layer 1 and the base foil is rolled up. Further processing is effected as described above by printing on and washing off the etching agent 8.

Figure 4:
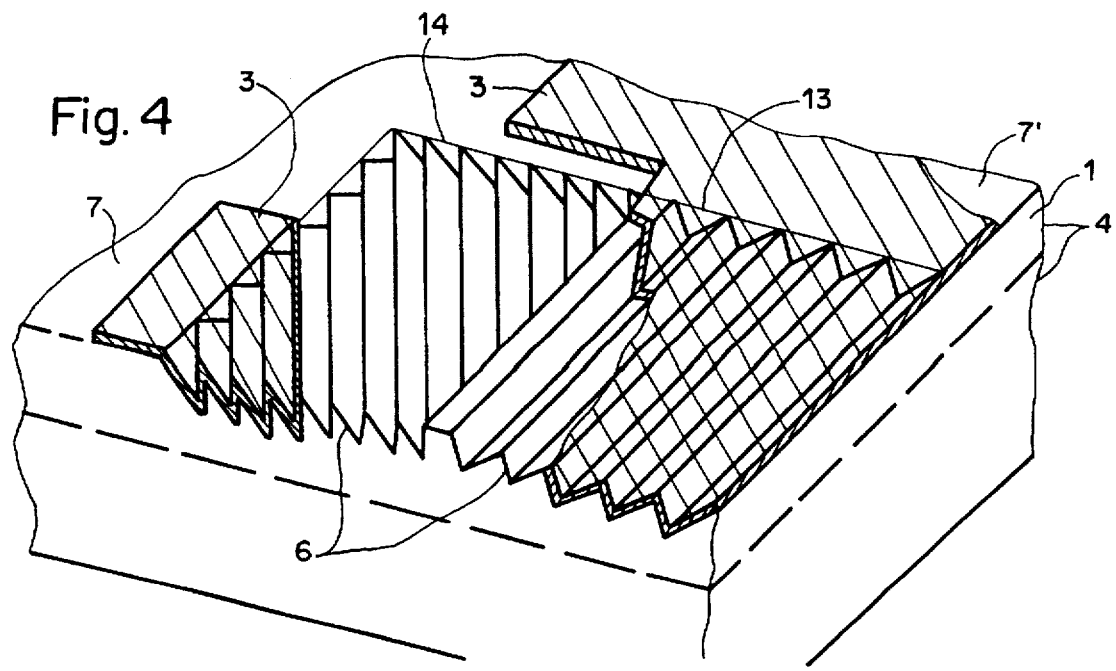
FIG. 4 shows a view of the embossed base foil after the etching step.

The process produces on the one surface of the base foil 4 a structure of which a portion is shown in the view in FIG. 4. Areas 13 and 14 have relief structures 6 which differ in terms of profile, grating spacing and azimuth. The reflection layer 3 is removed in the surface portions 7; 7' and the surface of the lacquer layer 1 is exposed. For reasons relating to the drawing, the surface of the reflection layer 3 is slightly hatched. The unembossed smooth surface portions which are covered with the reflection layer 3 act as mirrors.

Figure 5:
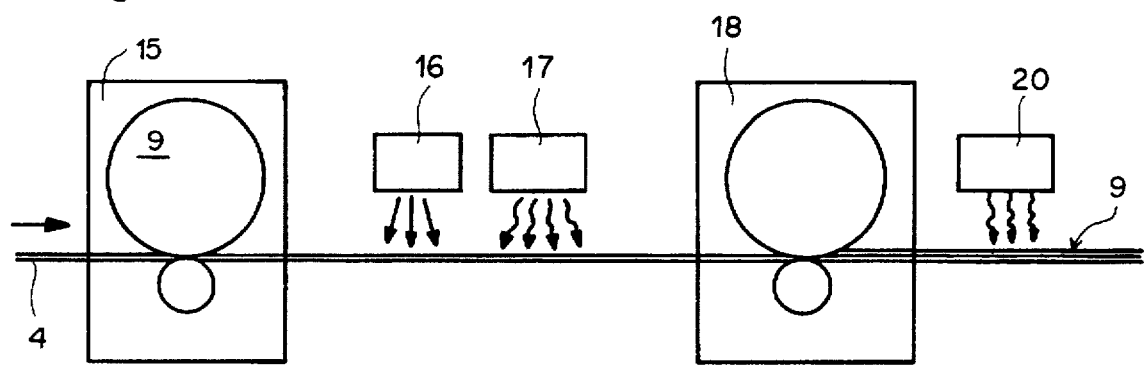
FIG. 5 shows a production line.

In an apparatus for carrying out the process the base foil 4 is moved from left to right in the view in FIG. 5. In the printing mechanism 15 the base foil 4 is printed upon with the etching agent 8 (FIG. 2) on the side of the reflection layer 3 (FIG. 2), by means of the printing cylinder 9. The base foil 4 then passes, in the optimum time for the etching procedure, into a cleaning installation 16 in which for example water is sprayed thereon to rinse the surplus etching agent 8 with the dissolved material of the reflection layer 3 off the base foil. The water remaining on the surface of the base foil 4 is evaporated in a drier 17 so that the base foil 4 passes in a completely dry condition into an applicator mechanism 18 where a roller is used to apply a protective layer 19 of 1 μm to 10 μm in thickness over the entire surface area to the side with the etched reflection layer 3 of the base foil 4. The material of the protective layer 19 can be a layer which can cure by means of ultra-violet light or it can be a conventionally drying lacquer with a solvent. The design configuration of the device 20 therefore depends on the material of the protective layer 19. In the first case the device 20 includes ultra-violet radiators for initiating the curing step or in the second case it generates heat energy for accelerated evaporation of the solvent.

Instead of the processing line shown in FIG. 5, the etched base foil 4 can be rolled up after leaving the drier 17. At a later time the etched base foil 4 is fed from the roll to the applicator mechanism 18 and the protective layer 19 is applied and dried.

Figure 6:
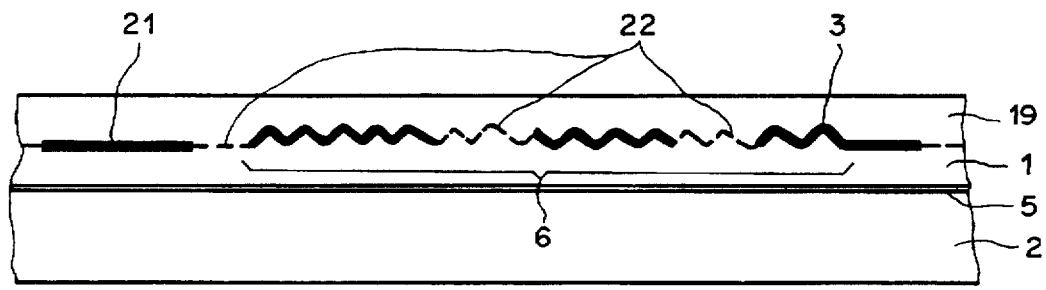
FIG. 6 is a view in cross-section of a plastic laminate.

In FIG. 6 the reflection layer 3 which has remained outside the surface portions 7 (FIG. 3) and in the surface portions 7 the free surface of the lacquer layer 1 of the base foil 4 (FIG. 4) is covered over the full surface area with the protective layer 19 for protecting the reflection layer 3 over the relief structures 6 and over other structures 21. With the application of the protective layer 19 the reflection layer 3 with the relief structures 6 or with the structures 21 is embedded into a plastic laminate 1, 19 from which the security elements are produced. In general the adhesion between the lacquer layer 1 and the protective layer 19 in the surface portions 7 is substantially higher than the adhesion between the lacquer layer 1 or the protective layer 19 and the reflection layer 3. The protective layer 19 can therefore no longer be removed without destroying the relief structures 6 in the adjacent areas. In conformity with above-mentioned Swiss patent specification No. 670 904 the interfaces formed by the lacquer layer 1 and the protective layer 19 are identified as adhesion bridges 22.

The protective layer 19 advantageously has the same refractive index as the lacquer layer 1 as the relief structures 6 which are not covered by the reflection layer 3 or the smooth exposed surfaces of the lacquer layer 1 become invisible, after application of the protective layer 19. No optically effective interface is formed between the lacquer layer 1 and the protective layer 19. Therefore, no light is reflected or diffracted in the direction of the viewer, in the adhesion bridges 22. The transition between the lacquer layer 1 and the protective layer 19 is shown in broken lines in the drawing, for reasons of representation thereof.

The transparent materials which can be used for lacquers only have a difference in terms of the refractive index of at most about 0.4. If that difference is more than 0.1 reflection phenomena occur in the adhesion bridges 22 at the interface between the lacquer layer 1 and the protective layer 19, and those reflection phenomena are still just visible to the eye at a certain angle of view but they do not interfere with transparency. If that difference is less than 0.1 the intensity of the reflected or diffracted light is too low to be able to perceive reflections or diffraction effects by the naked eye.

In a first embodiment the protective layer 19 comprises a conventionally drying adhesive and is adapted to join the base foil 4 to the surface of an article. The thickness of the adhesive layer depends on the surface structure of the surface to be adhered to. In a second embodiment firstly a non-adhesive protective lacquer, for example the same lacquer as for the lacquer layer 1, is applied, and the adhesive layer is applied as an outermost layer in a second arrangement (not shown here) which comprises a second applicator mechanism 18 (FIG. 5) and the second drying device 20 (FIG. 5). The term adhesive is used to mean the known hot adhesives and cold adhesives.

If the carrier foil 2 serves as the basis for the value or credit card, the bonding agent or primer is used for the intermediate layer 5 and the non-adhesive transparent protective lacquer is used for the protective layer 19. In this third configuration the relief pattern of the relief structures 6 is visible both through the protective layer 19 and also through the card basis, if they are transparent, an advantage of this process which is not to be underestimated in terms of the graphic configuration. Further processing to afford value or credit cards includes possibly conventional printing, cutting it free from the strip, and packaging.

If a plurality of security elements are arranged in side-by-side relationship on the base foil 4 which is suitable for being glued in position, with the protective layer 19, the base foil 4 is firstly cut lengthwise to the width of a security element, and rolled up. Each of those rolls has a large number of such successively arranged security elements.

Figure 7:
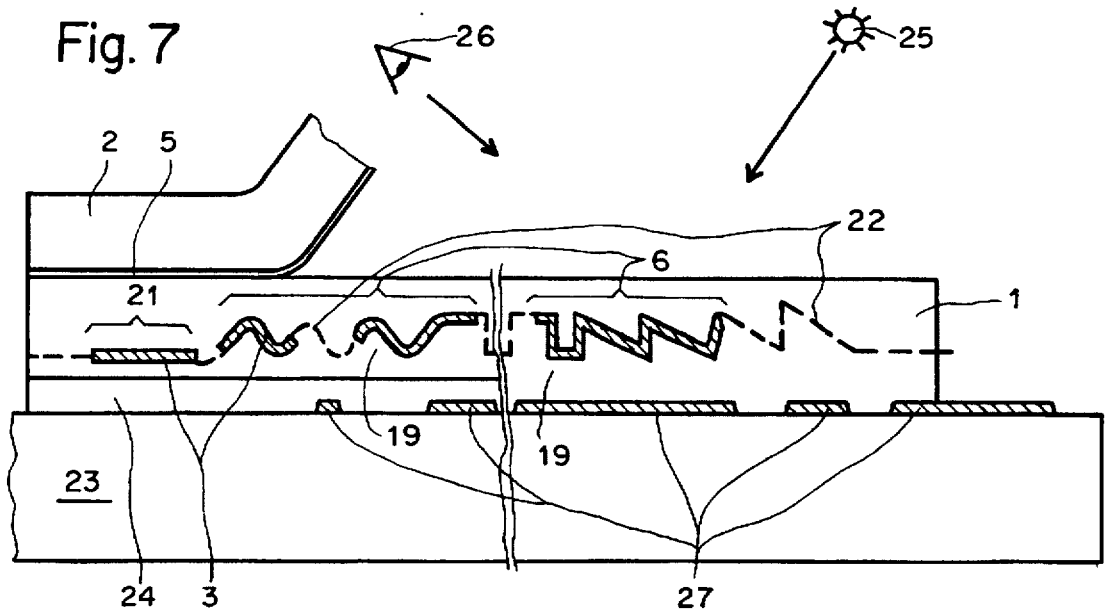
FIG. 7 is a security element on a document.

The security element produced in accordance with the described processes is stuck onto an article 23 in FIG. 7. On the left-hand side of the drawing the protective layer 19 is covered with an adhesive layer 24 while on the right-hand side of the drawing the protective layer 19 itself comprises an adhesive material. As the security element adheres to the article 23 the carrier foil 2 can be pulled off if the intermediate layer 5 is in the form of a separation layer.

The surface pattern of the security element, which pattern is formed from the printed image and from the relief pattern, has regions embedded in the form of optical markings in the plastic laminate 1, 19, with the reflection layer 3 over the relief structures 6 and the diffusing or reflecting structures 21 as well as the transparent adhesive bridges 22. The surface pattern is advantageously surrounded by an interconnected adhesive bridge 22 in order to protect the reflection layer 3 from corrosion and other environmental influences. The surface pattern is illuminated by a light source 25 and viewed by an observer 26 with the naked eye. The security element is partially transparent, that is to say it is completely transparent in the adhesive bridges 22 and it is opaque in the regions which are adjacent to the adhesive bridges 22 and which are covered with the reflection layer 3, as the reflection layer 3 reflects the incident light, directly or diffracted. The characters or printed images, photographs or generally a structuring 27 of the surface of the article 23 under the security element are visible to the observer 26 through the transparent adhesive bridges 22. The various diffusing or reflecting surface elements of the surface pattern, which diffract the light, are visible even with poor illumination with a high level of light intensity, while in the transparent adhesive bridges 22 reflection and diffraction phenomena which occur as a result of a variation in refractive index that may occur mean that only very weak-light effects are to be observed, even under good viewing conditions, and such effects do not interfere with recognition of the structuring 27 on the article 23.

The optically effective surface elements are for example lines, guilloche patterns, dots, microscripts, polygons etc. from which the surface pattern is composed. In dependence on the direction of illumination and the orientation of the security element, the viewer of the surface patterns sees the perceptible image, a coloured representation, which changes in a predetermined fashion when the direction of illumination and the direction of viewing are altered by turning or tilting the security element because the regions with the reflection layer 3 diffuse, reflect or diffract the incident white light in predetermined directions. When the security element is turned or tilted, besides the structuring 27, the observer additionally sees the surface pattern which changes in terms of colour, size and shape in dependence on the instantaneous direction of illumination and viewing, in contrast to the structuring 27.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A process for producing a partially transparent security element having a visually discernible surface pattern comprising diffraction-optically effective optical markings with non-continuous reflection layers and transparent adhesive bridges embedded into a plastic laminate, the process comprising:

forming microscopically fine relief structures in a lacquer layer of a base foil;

covering over the full surface area of said lacquer layer with a reflection layer;

applying an etching agent to said reflection layer by a printing procedure as a predetermined printed image, whereby, at surface portions corresponding to said printed image, said reflection layer is removed by said etching agent and the surface of said lacquer layer is exposed; and forming said plastic laminate by covering the lacquer layer at said surface portions and the remaining surfaces of said reflection layer with at least one transparent protective layer having a refractive index difference to the lacquer layer of less than about 0.4, whereby said transparent adhesive bridges are produced at said surface portions from the direct connection of said lacquer layer to said protective layer.

2. A process according to claim 1, wherein at least two said relief structures which differ in respect of grating parameters are formed in said lacquer layer.

3. A process according to claim 2, wherein said printed image is produced in register relationship with said surface pattern comprising said optical markings.

4. A process according to claim 3, wherein a continuous said adhesive bridge is produced around said surface pattern to protect said reflection layer from corrosion.

5. A process according to claim 1, wherein said base foil includes a carrier foil and a primer layer applied between said lacquer layer and said carrier foil, and wherein a transparent foil is used as said carrier foil so that said optical markings are visible both through said protective layer and also through said carrier foil.

6. A process according to claim 1, wherein said protective layer is of a material which differs in refractive index by at most 0.1 from the material of said lacquer layer.

7. A process according to claim 1, wherein said protective layer is of the same material as said lacquer layer.

8. A process according to claim 1, wherein said reflection layer is of aluminium and said etching agent is an alkaline etching agent.

9. A process for producing a partially transparent security element having a visually discernible surface pattern comprising diffraction-optically effective optical markings with non-continuous reflection layers and transparent adhesive bridges embedded into a plastic laminate, the process comprising:

embossing a base foil comprising a lacquer layer which is covered with a reflection layer with microscopically fine relief structures;

applying an etching agent to said reflection layer by a printing procedure as a predetermined printed image, whereby, at surface portions corresponding to said printed image, said reflection layer is removed by said etching agent and the surface of said lacquer layer is exposed; and forming said plastic laminate by covering the lacquer layer at said surface portions and the remaining surfaces of said reflection layer with at least one transparent protective layer having a refractive index difference to the lacquer layer of less than about 0.4, whereby said transparent adhesive bridges are produced at said surface portions from the direct connection of said lacquer layer to said protective layer.

10. A process according to claim 9, wherein at least two said relief structures which differ in respect of grating parameters are formed in said lacquer layer.

11. A process according to claim 10, wherein said printed image is produced in register relationship with said surface pattern comprising said optical markings.

12. A process according to claim 11, wherein a continuous said adhesive bridge is produced around said surface pattern to protect said reflection layer from corrosion.

13. A process according to claim 9, wherein said base foil includes a carrier foil and a primer layer applied between said lacquer layer and said carrier foil, and wherein a transparent foil is used as said carrier foil so that said optical markings are visible both through said protective layer and also through said carrier foil.

14. A process according to claim 9, wherein said protective layer is of a material which differs in refractive index by at most 0.1 from the material of said lacquer layer.

15. A process according to claim 9, wherein said protective layer is of the same material as said lacquer layer.

16. A process according to claim 9, wherein said reflection layer is of aluminium and said etching agent is an alkaline etching agent.

* * * * *